US012564939B2

(12) United States Patent
Rakshit et al.

(10) Patent No.: US 12,564,939 B2
(45) Date of Patent: Mar. 3, 2026

(54) SWARM SNAKE ROBOTS' COLLABORATION FOR CONTROLLING ROPES

(71) Applicant: International Business Machines Corporation, Armonk, NY (US)

(72) Inventors: Sarbajit K. Rakshit, Kolkata (IN); Asim Munawar, Demarest, NJ (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 18/351,685

(22) Filed: Jul. 13, 2023

(65) Prior Publication Data

US 2025/0018556 A1      Jan. 16, 2025

(51) Int. Cl.
| | |
|---|---|
| *B25J 9/06* | (2006.01) |
| *B25J 9/10* | (2006.01) |
| *B25J 9/16* | (2006.01) |
| *B25J 19/02* | (2006.01) |

(52) U.S. Cl.
CPC .............. *B25J 9/065* (2013.01); *B25J 9/104* (2013.01); *B25J 9/1689* (2013.01); *B25J 19/023* (2013.01)

(58) Field of Classification Search
CPC . B25J 9/065; B25J 9/104; B25J 9/1689; B25J 19/023
USPC ........................................................ 700/245
See application file for complete search history.

(56) References Cited

U.S. PATENT DOCUMENTS

| | | | | |
|---|---|---|---|---|
| 8,899,359 | B1* | 12/2014 | Hafenrichter | .......... B25J 9/1679 |
| | | | | 180/7.1 |
| 11,947,362 | B1* | 4/2024 | Alnajjar | .............. F16L 55/1645 |
| 12,091,111 | B1* | 9/2024 | Zhang | .................. B62D 57/024 |
| 2014/0110021 | A1* | 4/2014 | Divine | ............... A01G 23/0955 |
| | | | | 144/24.13 |
| 2023/0191861 | A1* | 6/2023 | Tan | ........................ B60F 3/0061 |
| | | | | 440/6 |
| 2023/0406496 | A1* | 12/2023 | Perumalla | ................ B25J 15/08 |
| 2024/0181628 | A1* | 6/2024 | Muniz, Jr. | .................. B25J 5/02 |

FOREIGN PATENT DOCUMENTS

| | | |
|---|---|---|
| CN | 110900656 B | 3/2021 |

OTHER PUBLICATIONS

Abbeel, P. et al. (2013) Autonomous Robotic Knot Tying through Learning from Demonstrations. https://www.youtube.com/watch?v=AJIID3AiSqs <Retrieved Apr. 25, 2023>.

D. S. D'Antonio and D. Saldaña, "Folding Knots Using a Team of Aerial Robots," 2022 IEEE/RSJ International Conference on Intelligent Robots and Systems (IROS), Kyoto, Japan, 2022, pp. 3372-3377, doi: 10.1109/IROS47612.2022.9981363.

Fang G, Cheng J. Advances in Climbing Robots for Vertical Structures in the Past Decade: A Review. Biomimetics (Basel). Jan. 22, 2023;8(1):47. doi: 10.3390/biomimetics8010047. PMID: 36810378; PMCID: PMC9944140.

(Continued)

*Primary Examiner* — Kira Nguyen

(74) *Attorney, Agent, or Firm* — Kimberly Zillig

(57) ABSTRACT

A system including one or more snake robots, and a plurality of ropes. The one or more snake robots are adapted to be coupled to each of the plurality of ropes in order to control movement of the plurality of ropes in an activity.

20 Claims, 5 Drawing Sheets

100

(56)     References Cited

OTHER PUBLICATIONS

Heater, B. (2017) How Carnegie Mellon's snake robot became the multi-legged snake monster. https://techcrunch.com/2017/07/06/how-carnegie-mellons-snake-robot-became-the-multi-legged-snake-monster/ <Retrieved Apr. 25, 2023>.

Joesinstructables "Snake Robot" https://www.instructables.com/Snake-Robot-1/ <Retrieved Apr. 25, 2023>.

Modular Snake Robots—CMU Biorobotics. http://biorobotics.ri.cmu.edu/projects/modsnake/ <Retrieved Apr. 25, 2023>.

S. Hirose and E. F. Fukushima, "Snakes and strings: new robotic components for rescue operations," Proceedings of the 41st SICE Annual Conference. SICE 2002., Osaka, Japan, 2002, pp. 338-343 vol.1, doi: 10.1109/SICE.2002.1195418.

Snake Robots Market Size, Industry Share, Forecast 2030. https://www.fortunebusinessinsights.com/snake-robots-market-102881 <Retrieved Apr. 25, 2023>.

Teufelberger—Tailor-made rope solutions for your industrial application. https://www.teufelberger.com/en/products-services/high-tech-fiber-ropes/fiber-ropes-for-general-industrial-applications.html <Retrieved Apr. 25, 2023>.

Tree Trimming Services in the US—Market Size 2005-2009 (2023) https://www.ibisworld.com/industry-statistics/market-size/tree-trimming-services-united-states/#:~:text=The%20market%20size%2C%20measured%20by,to%20increase%202.2%25%20in%202023 <Retrieved Apr. 25, 2023>.

* cited by examiner

100

150

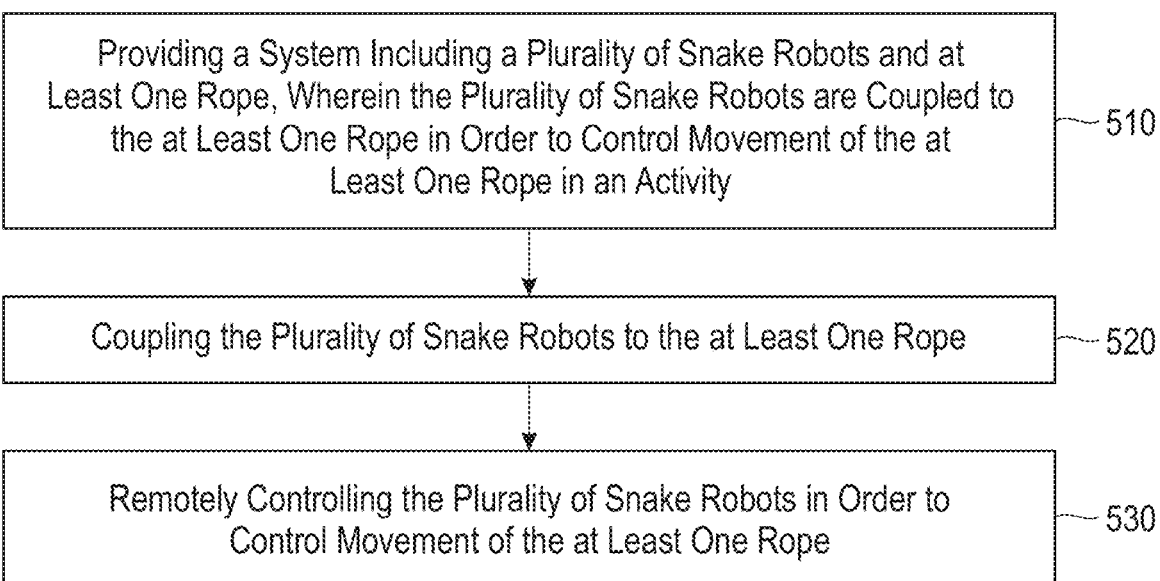

500

Providing a System Including a Plurality of Snake Robots and at Least One Rope, Wherein the Plurality of Snake Robots are Coupled to the at Least One Rope in Order to Control Movement of the at Least One Rope in an Activity — 510

Coupling the Plurality of Snake Robots to the at Least One Rope — 520

Remotely Controlling the Plurality of Snake Robots in Order to Control Movement of the at Least One Rope — 530

FIG. 5

SWARM SNAKE ROBOTS' COLLABORATION FOR CONTROLLING ROPES

BACKGROUND

The present disclosure relates to using robots for certain activities. More particularly, the present disclosure provides a swarm of snake robots that can be collaborated in order to control a rope, ropes, string, cable, chain or another flexible, linear tensioning device (generically "rope") in an activity area.

Robotics is an area of active research, and various types of robots have been developed for various activities.

SUMMARY

According to some embodiments of the disclosure, there is provided a system including one or more snake robots, and a plurality of ropes. The one or more snake robots are adapted to be coupled to each of the plurality of ropes in order to control movement of the plurality of ropes in an activity.

According to some embodiments of the disclosure, there is provided a system including one or more snake robots, and a rope. The one or more snake robots are adapted to be coupled to the rope in order to control movement of the rope in an activity.

According to some embodiments of the disclosure, there is provided a method of controlling movement of at least one rope using one or more snake robots. The method includes providing a system including one or more snake robots, and at least one rope. The one or more snake robots are adapted to be coupled to the at least one rope in order to control movement of the at least one rope in an activity. The method also includes coupling the one or more snake robots to the at least one rope. The method further includes remotely controlling the one or more snake robots in order to control movement of the at least one rope.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is a flow diagram of a method of controlling movement of at least one rope using a plurality of snake robots, in accordance with embodiments of the disclosure.

Figure 1:
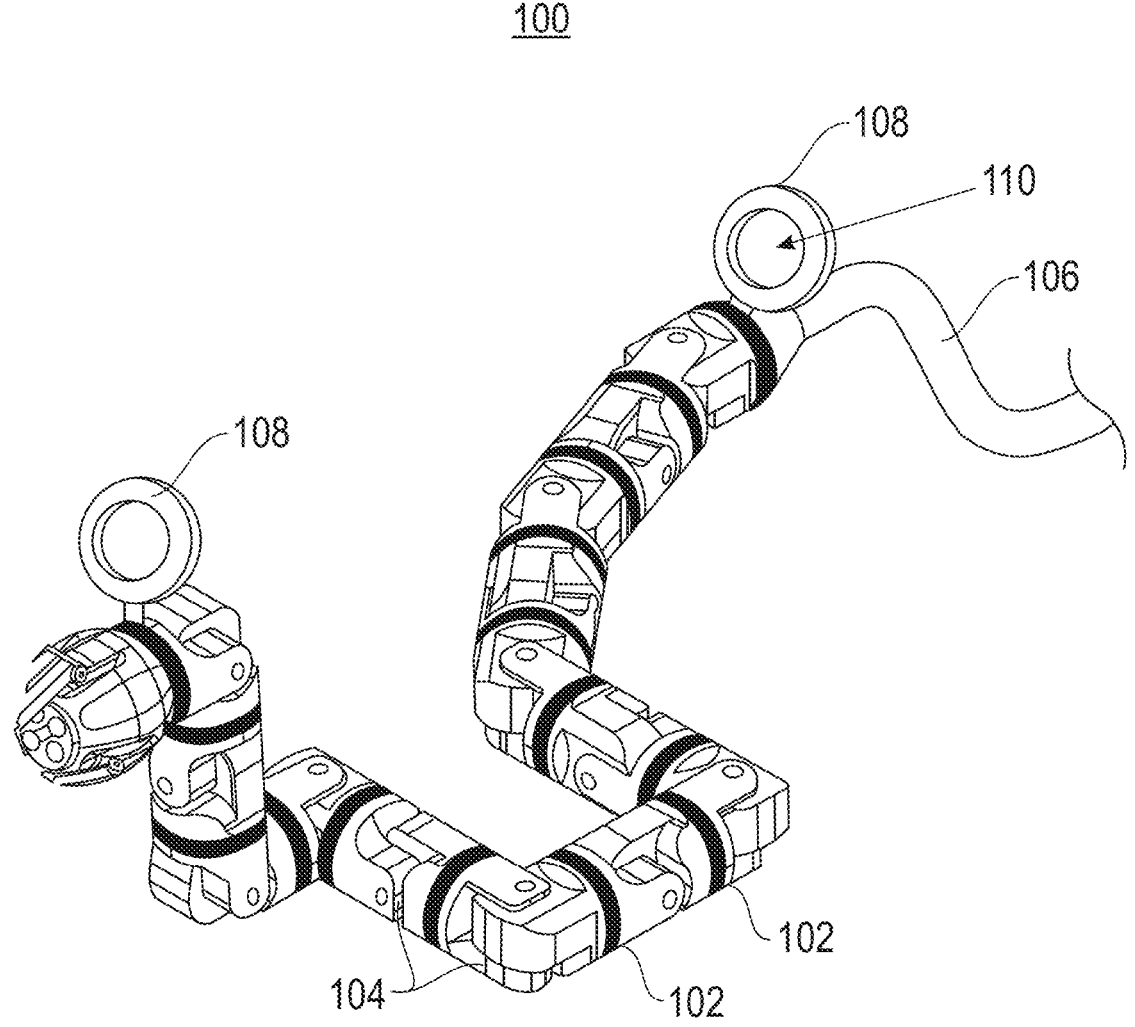
FIG. 1 is a schematic, top-view illustration of a snake robot, in accordance with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to using robots for certain activities. More particularly, the present disclosure provides a system that is capable of controlling one or more swarms of snake robots that can be collaborated in order to perform an activity using a rope, ropes, string, cable, chain or another flexible, linear tensioning device (generically "rope") in an activity area. While the present disclosure is not necessarily limited to such applications, various aspects of the disclosure can be appreciated through a discussion of various examples using this context.

While performing different activities, like a rescue operation, and/or debris or material movement on an industrial floor, for example, ropes can be used. There can be various applications of such ropes. One or more ropes can be manually tied onto objects in order to be able to move the objects using the ropes. Manual activities can be required in order to tie the ropes that can be used to move objects.

Manual activity can be required for tying ropes to perform various activities on an industrial floor or in a rescue operation, for example. In some situations, it can be difficult to carry ropes to an activity area, thus external robotic systems can be used to carry the ropes. Although robots can be used to carry the ropes, they are not capable of tying the rope around an object, etc. Thus, manual activities can be necessary after delivery of the ropes using such robotic systems.

A snake-arm robot, or "snake robot," is a computerized electro-mechanical device with many features found in industrial robotic arms. The "snake" description refers to the snake robot's long, generally cylindrical shape, which can move in ways that are reminiscent of a snake. Snake robots can have a continuous diameter along their length. Snake robots can pass through narrow passages. Snake robots can be, for example, tendon-driven or pneumatically-controlled. Snake robots are often used in association with another device. The function of the other device can be to control the snake robots, for example.

Embodiments of the present disclosure relate to a swarm of snake robots that are capable of being collaborated in order to perform an activity using a rope or ropes in an activity area. For example, the present disclosure relates to a system and a method of controlling movement of at least one rope using a swarm of snake robots.

For purposes of this disclosure, reference will be made to an illustrative snake robot that is capable of being used in a group of two (2) or more snake robots, or "swarm" of snake robots, in which multiple snake robots are controlled and used together to perform an activity using one or more ropes. Of course, the disclosure herein should not be considered to be limited to the illustrative examples depicted and described herein. With reference to the attached figures, various illustrative embodiments of the devices, systems and methods disclosed herein will now be described in more detail.

Turning to the figures, FIG. 1 illustrates a schematic, top-view of an example snake robot 100 consistent with some embodiments. The snake robot 100 includes a plurality of modules 102 in a generally linear arrangement, with the modules 102 being adjacent to each other and connected to each other in a universal joint method. A plurality of joints 104 can be included that result in the modules 102 positioning themselves into a wide variety of configurations and orientations with respect to each other, including orthogonal, such as shown in FIG. 1. Other joints can be flexible joints, for example (e.g., flexible rods, hinges, ball and socket joints, etc.). A combination of joints 104 and other types of joints (not shown) can be included, or only joints 104 can be included. The joints 104 can connect mutually adjacent modules 102, and can allow the modules 102 to move with respect to each other. Other suitable joints allowing a snake-like movement of the snake robot 100 are also contemplated. Movement of the snake robot 100 can include a driving movement of the snake robot 100, which allows for forward and reverse movement and/or side-to-side movement.

A bundle of control wires 106, which extends out an end of the snake robot 100, can extend through and between the plurality of modules 102 in order to control movement of the plurality of modules 102 and communicate movement instructions to the components of the snake robot 100. In general, the snake robot 100 can include a movement control assembly (not shown) for controlling movement of the snake robot 100. Any suitable movement control assembly is contemplated by the disclosure. Some examples include, without limitation, tendon-driven, motor-driven and pneumatically-controlled assemblies. The movement control process can involve using rods and joints, for example, to move the snake robot 100 in a serpentine fashion.

Movement instructions for the modules 102 can be remotely communicated to the snake robot 100 from a computer or other device, for example, and to a communication unit (not shown) within the snake robot 100. The communication unit can be connected to one or more wires included in the bundle of control wires 106, and can be connected to a movement control assembly. A computer or mobile device (not shown), for example, can communicate wirelessly with the communication unit, which in turn can connect with the internet.

The snake robot 100, as shown in FIG. 1, can include one or more rope attachment mechanism or device 108. Two (2) rope attachment mechanisms or devices 108 are shown in FIG. 1. One or more of the rope attachment mechanisms 108 can be located on different modules 102 of the snake robot 100. A rope (not shown) can be tied to the rope attachment mechanism or device 108 and/or run through an opening 110 in the rope attachment mechanism 108. The rope attachment mechanism or device 108 shown in the figure is one example. Any suitable mechanism for attaching or coupling a rope (not shown in FIG. 1) to the snake robot 100 is contemplated by the disclosure. The rope attachment mechanism or device 108 can be capable of reversibly attaching, i.e., coupling and un-coupling, a rope to the snake robot 100. The rope attachment mechanism 108 shown can, for example, open and close as desired in order to load a rope or release the rope from the snake robot 100.

Figure 2:
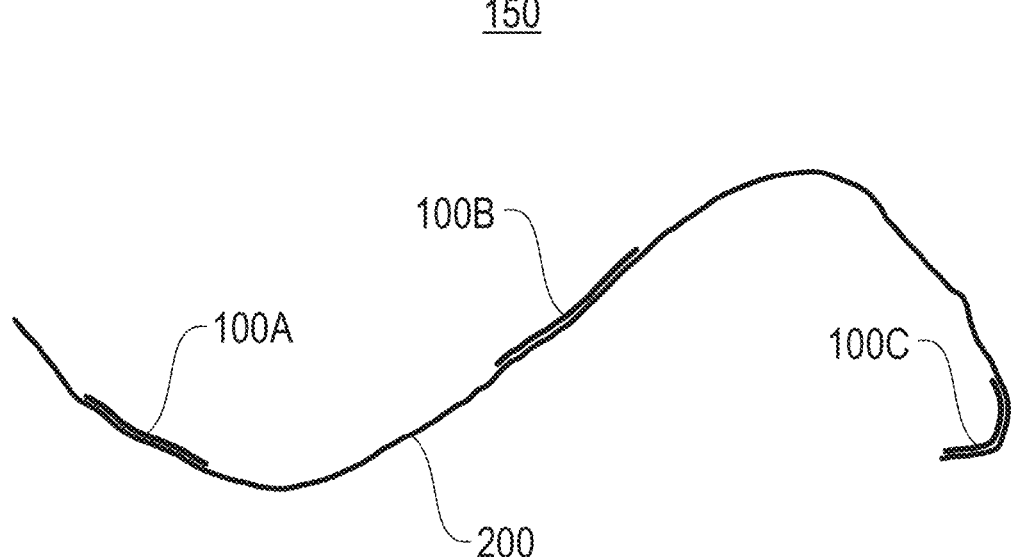
FIG. 2 shows a schematic, top-view illustration of a system including a rope with multiple snake robots (or a swarm of snake robots) attached to the rope, in accordance with embodiments of the present disclosure.

FIG. 2 shows a schematic, top-view illustration of a system 150 including a rope 200 with multiple snake robots 100 (or a swarm of snake robots 100A-C) attached to the rope 200, in accordance with embodiments of the present disclosure. As shown, a plurality of snake robots 100A, 100B, 100C (three (3) shown) can be used to deliver the rope 200 to a desired location and can tie or attach the rope 200 to an object at the desired location, for example. The snake robots 100A-C actively tie or attach the rope to the object. The rope 200 can be used for many purposes, such as for wrapping or tying, etc. A "rope" can be defined as any flexible, linear tensioning device. One example is any length of strong cord made by twisting together strands of natural or artificial fibers. Some examples of materials that can make up the rope 200 include polypropylene, hemp, polyester, etc. The rope 200 can be made of a natural fiber, such as one derived from an abaca plant. Manila rope is an example, which is known for its strength and durability. Manila rope is resistant to ultraviolet (UV) light and has good grip properties. Hemp rope is another example, which is a rope made from hemp plant. Hemp rope is strong, flexible, and resistant to rot and mildew. Hemp rope has been traditionally used for various applications, including ship rigging and construction. Synthetic fibers can also be used for the rope 200, such as polypropylene, nylon, polyester and polyethylene, for example. In addition, blended fibers can be used to form the rope 200. Yet another example of the type of rope 200 that can be used includes steel wire rope. Other suitable materials are also contemplated. It is also contemplated that other lengthy items besides rope can be delivered using the snake robots 100A-C. For example, cables and wires can be used as a rope.

Based on a particular operational need for performing a particular activity, such as a need for moving a long rope, a plurality of snake robots 100 can be coupled, or can automatically couple themselves, to the rope 200. The plurality of snake robots 100A-C, as shown, can be considered a "swarm" of snake robots 100 that can be attached to the rope 200 at various points or locations along the length of the rope 200. A "swarm" of snake robots (such as 100A-C) can be defined as two (2) or more snake robots 100A-C that can move somewhere in order to perform an activity, for example. The number of snake robots 100 in the swarm can be any number of snake robots 100 over one (1) snake robot 100. In this application described herein, the swarm of snake robots 100A-C can be used to perform activities such as moving the rope 200 to a desired location, tying the rope 200 around a desired object, and knotting the rope to securely hold the object, for example. The rope 200 can then be used to move an object or objects, for example.

In order to perform a desired activity with the rope 200, there can be a desired movement path for each of the plurality of snake robots 100A-C. One or more snake robots, like the plurality of snake robots 100A-C, can be attached to the rope 200 so that the rope 200 can be steered along with collaborative movement of the snake robots 100A-C. A movement profile of the rope 200 can be maintained along a movement path in an activity area. The plurality of snake robots 100A-C can control a direction or directions of movement of the rope 200.

It is contemplated that the snake robot 100 (or swarm of snake robots 100A-C), can include a controller that can be used to deliver the rope 200, for example, to a desired site. Although not shown, the snake robot 100 can include various cameras, sensors, computing modules, batteries, a global positioning system (GPS), etc. The cameras, for example, can allow for remote viewing of objects near the snake robot 100. The cameras and GPS, for example, can allow for more accurate placement of the swarm of snake robots 100A-C that can be used to perform desired activities.

Figure 3:
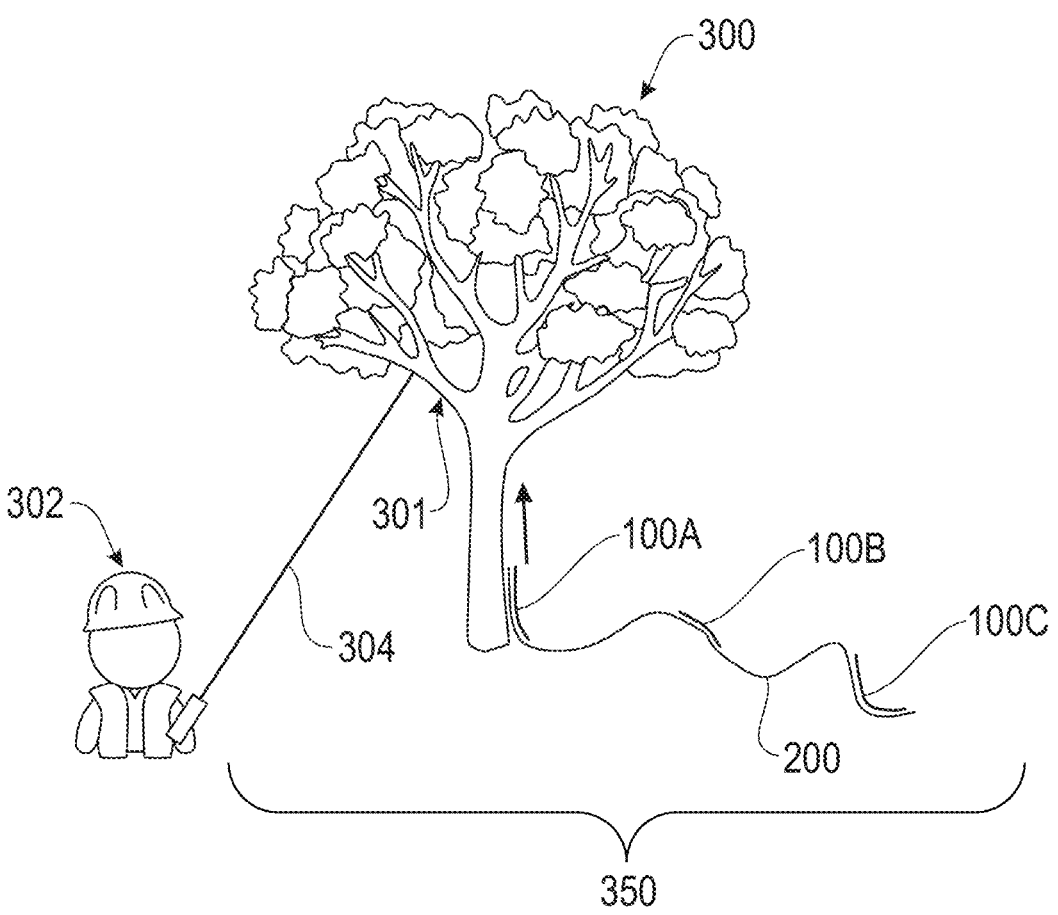
FIG. 3 shows a swarm of snake robots attached to a rope that is shown moving up a tree, in accordance with embodiments of the present disclosure.

FIG. 3 shows a swarm of snake robots 100A-C attached to a rope 200 that is shown (by arrow) moving up a tree 300, in accordance with embodiments of the present disclosure. An operator 302 (or worker) is shown aiming a laser 304 at a point (e.g., tree branch 301) in the tree 300 located in an activity area 350 where the swarm of snake robots 100A-C attached to the rope 200 is desired to move the rope. The controller (not shown) or controllers can control the snake robots 100A-C so that they are capable of moving towards a point in the tree 300 that the laser 304 is directed towards, in order to perform an activity at that point or location. For example, the rope 200 can be tied into a knot by the snake robots 100A-C around the branch 301 of the tree 300. The rope 200 can then be used to pull the branch 301 down, for example, if it was dead or dying.

An "activity area" where the snake robots 100A-C can be used includes any area where the snake robots 100A-C are useful. The activity area can be an industrial area in which materials are desired to be moved. The activity area can be any area where handling of rope is required, for example. An example of one area of industry where rope is desired to be moved and tied is the shipping industry. Any suitable area of industry or services is contemplated by the disclosure.

Cutting trees can be dangerous and expensive. The swarm of snake robots 100A-C attached to the rope 200 can help to reduce the time and cost of tree pruning, for example. The rope 200 can be attached to a part of the tree 300 that needs to be cut. After the tree is cut, a portion of the tree 300 that was cut off may not fall to the ground if it is tied up with the rope 200. For example, the operator 302 can point the laser 304 to the branch 301 in the tree 300 where the rope 200 needs to be tied. The snake robots 100A-C with the rope 200 attached can move to the branch 301 that is indicated by the laser 304. The snake robots 100A-C can tie a knot in the rope 200 at the laser-indicated area of the tree 300. The branch 301 can be cut from the tree 300 using any suitable method, and the branch 301 that is tied up with the rope 200 may not fall down.

Figure 4:
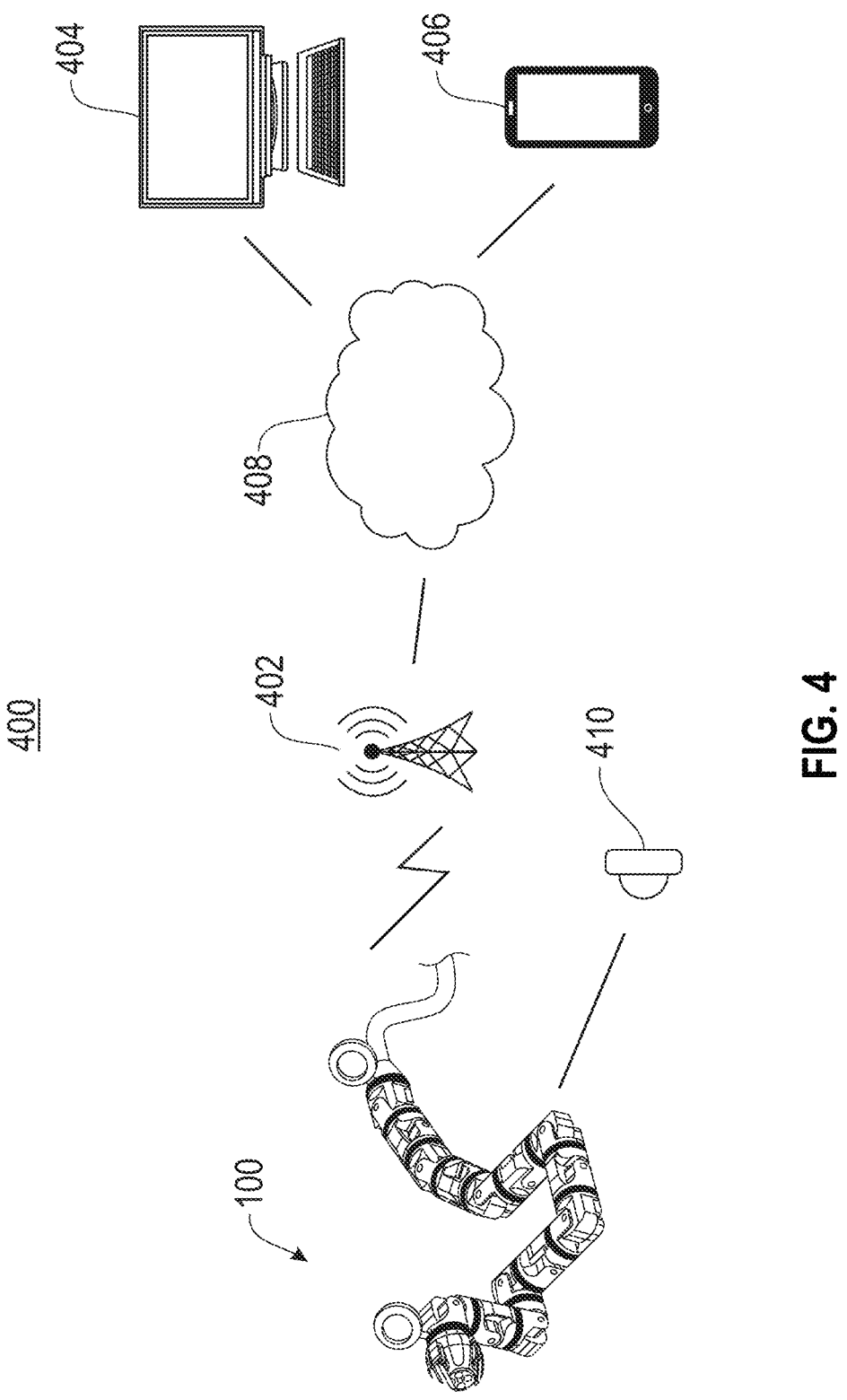
FIG. 4 illustrates an embodiment of a system, in accordance with embodiments of the present disclosure.

FIG. 4 illustrates an embodiment of a system 400, in accordance with embodiments of the present disclosure. System 400 depicts an overall architecture, and not all components are required for all embodiments. For example, in some embodiments of the system 400, a snake robot 100 can be attached to the rope 200, for example, and can be completely autonomous and may not require a command center (e.g., a computer) 404, and can be capable of carrying out a desired activity. The snake robot 100 can communicate wirelessly with a base station 402, which in turn can connect with an internet 408. The command center 404 and a mobile device 406 can be connected to the internet 408 and can communicate with each other and with the snake robot 100. The command center 404 and the mobile device 406 can alternatively be other suitable devices or controllers, and are not limited to a computer and mobile phone, as shown. The system 400 can include a scanning module 410, such as a camera, as shown.

The system 400 can include one or more snake robots 100 at different parts of a rope (not shown) to manipulate it for a particular task. The system 400 can identify how the snake robots 100 can perform tasks and be mobile in their surroundings. Based on an identified mobility possibility in the surroundings, the system 400 can identify if the snake robots 100 are attached to a rope, etc. (not shown). Based on current operational needs, the snake robots 100 can be coupled or de-coupled from a rope, for example. The plurality of snake robots 100 can be joined to a rope if needed in order to move the rope or tie the rope, for example.

In some embodiments, the systems 150, 400 described herein, for example, can use various scanning modules in an activity area. Some example scanning modules, such as an Internet of Things (IoT), a camera system, etc., can be used to identify the type of activity that is desired to be performed. The systems 150, 400 can also recognize objects in the activity area, based on visual and IoT analysis, for example, which can also identify dimensions of the objects. Based on object recognition, dimensional estimation, or using historical data, for example, the system 150, 400 can calculate an estimated weight of the object(s). Based on a relative position of each object, their weight, and their orientation, an estimated force can be calculated. Manual input can also be considered in estimating the force. The systems 150, 400 can consider manual input to know where the rope 200 can be used for performing different activities. Based on historical data about the activity area where the rope 200 can be used or with manual commands, the systems 150, 400 can identify where the rope 200 can be used and what types of activities can be performed. The system 150, 400 can identify how the rope 200 needs to be carried, or how it is to be moved in the activity area or surroundings. The systems 150, 400 can identify the weight of the rope 200, a distance that the rope 200 is to travel, and the types of activity that are to be performed.

In some embodiments, the systems 150, 400 described herein can use the swarm snake robotic system 150, 400 to control movement of the rope 200 and steer the rope 200 in an activity area. The systems 150, 400 can identify how much force is required to steer the rope 200 and the direction of movement, climbing, etc. The systems 150, 400 can also identify a required movement path of the rope 200 in the activity area. The systems 150, 400 can identify how many snake robots 100 are to be attached to the rope 200 such that the rope 200 can perform precise movement as per a profile path. Different snake robots 100 can be attached at different portions of the rope 200 and can generate force(s). The snake robots 100 can perform controlled movement at the activity area as per the required movement path. As the snake robots 100 are attached with the rope 200, the movement of the snake robots 100 cause the rope 200 to move. If tying of the rope 200 is required in an activity, the snake robots 100A-C can control movement that creates a knot and ties the rope 200. The snake robots 100A-C can drag the rope 200. The snake robots 100A-C can move through different passages, and the rope 200 can be steered along with the snake robots 100A-C.

In some embodiments, the systems 150, 400 can identify if multiple ropes are required to perform an activity. Each of the multiple ropes can include (or can be attached to) their own respective snake robot 100 or more than one snake robot 100. Once the snake robots 100 attached to multiple ropes are collaborated with each other, the ropes can be moved in a controlled manner. After the multiple ropes are wrapped or tied together or around an object, the systems 150, 400 can identify a required level of tightness based on a feed from a sensor or sensors (not shown), which can also identify the completeness of the activity.

In some embodiments, based on the context of any activity, estimated magnitude of force components from various objects and the direction of force etc., the system (such as system 400) can estimate how much counter force can be applied from various directions around the objects to make it stable or grip properly and if rope can be used for the same. One or more snake robotic system, such as 400, can collaborate with industrial ropes, for example, to convert the same with autonomous capability to perform auto-tying, wrapping of objects, etc.

In some embodiments, based on a required length of a rope or ropes for auto-tying or wrapping around an object, an appropriate number of snake robots (such as snake robot 100) or snake robotic systems (such as system 400) can be connected at different positions along with the length of the rope for controlled movement of the rope at an activity area.

In some embodiments, based on analysis of an activity area, a system of swarm snake robots 100 (such as system 400) can identify a required movement path profile of a rope 200 that is to be moved in an activity area or around the object, and can identify appropriate positions along a length of the rope 200 where snake robots 100 are to be attached, so that the movement of the rope 200 can perform the appropriate path profile.

In some embodiments, while ropes are being moved, tied or wrapped around any object(s), an attached swarm of snake robots 100A-C (such as snake robotic system 400) can generate required forces and directional movement control so that the desired activity can be performed in a proper manner. Upon completion of the activity, the snake robots 100A-C can then be detached from the ropes 200.

In some embodiments, based on an identified activity in an activity area, if multiple ropes are required and collaboration among the multiple ropes is required to perform the activity, then each snake robot 100 will be identified based on the controlling an individual rope. Accordingly, when multiple ropes are used, there can be collaboration among the snake robots 100A-C that are attached to the individual ropes 200.

In some embodiments, based on collaboration between a plurality of snake robots 100A-C and ropes 200 (such as using system 400), the system can perform digital twin simulation to identify if the ropes 200 have been tied or wrapped properly and have created a required level of gripping strength or counter force, and the same will also be used for creating historical knowledge corpus, FIG. 5 is a flow diagram of a method 500 of controlling movement of at least one rope 200 using a plurality of snake robots 100A-C, in accordance with embodiments of the disclosure. The method 500 includes an operation 510 of providing a system including a plurality of snake robots 100A-C, and at least one rope 200. The plurality of snake robots 100A-C is adapted to be coupled to the at least one rope 200 in order to control movement of the at least one rope 200 in an activity. The method 500 also includes an operation 520 of coupling the plurality of snake robots 100A-C to the at least one rope 200. The method 500 also includes an operation 530 of remotely controlling the plurality of snake robots 100A-C in order to control movement of the at least one rope 200.

The method 500 can also include an operation of tying or winding the at least one rope 200 around an object using the plurality of snake robots 100A-C. The method 500 can further include winding the at least one rope 200 around an object using the plurality of snake robots 100A-C. The method 500 can also include tying or winding the at least one rope 200 around a tree branch 301 using the plurality of snake robots 100A-C, wherein the remote controlling operation can include moving the plurality of snake robots 100A-C to the tree branch 301 and around the tree branch 301 in order to tie or wind the at least one rope 200 to the tree branch 301. The method 500 can further include decoupling the plurality of snake robots 100A-C from the at least one rope 200 after the at least one rope 200 is moved as desired. Some embodiments can include one or more macros (e.g., to wind an indicated object to or a knot, etc.) to automate portions of its operation 530. The method 500 can include the system that further includes at least one scanning module 410, and the method can further include scanning an area around the plurality of snake robots 100A-C using the at least one scanning module 410.

For purposes of description herein, the terms "upper," "lower," "top," "bottom," "left," "right," "rear," "front," "vertical," "horizontal," and derivatives thereof shall relate to the devices as oriented in the figures. However, it is to be understood that the devices can assume various alternative orientations and operation sequences, except where expressly specified to the contrary. It is also to be understood that the specific devices and processes illustrated in the attached drawings, and described in the following disclosure, are simply exemplary embodiments of the inventive concepts defined in the appended claims. Hence, other physical characteristics relating to the embodiments disclosed herein are not to be considered as limiting, unless the claims expressly state otherwise.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a plurality of snake robots, wherein the plurality of snake robots are long, cylindrical shaped robots; and
   a plurality of ropes,
   wherein the plurality of snake robots are adapted to be coupled to each of the plurality of ropes, carry the plurality of ropes, steer the plurality of ropes along at least one path by collaborative movement of the plurality of snake robots, and place the plurality of ropes in a location in order to perform an activity at the location.

2. The system of claim 1, wherein the plurality of snake robots are adapted to wind the plurality of ropes around an object.

3. The system of claim 1, wherein the plurality of snake robots are adapted to tie the plurality of ropes in a knot around an object.

4. The system of claim 1, further comprising:

at least one controller adapted to control movement of each of the plurality of snake robots.

5. The system of claim 1, further comprising:

at least one scanning module.

6. The system of claim 1, further comprising:

a global positioning system (GPS).

7. The system of claim 1, further comprising:

a laser adapted to be directed towards and to indicate the location; and a controller adapted to control movement of each of the plurality of snake robots to the location.

8. A system comprising:

a plurality of snake robots, wherein the plurality of snake robots are long, cylindrical shaped robots; and a rope, wherein the plurality of snake robots are adapted to be coupled to the rope at different portions of the rope, carry the rope, steer the rope along a path by collaborative movement of the plurality of snake robots, and place the rope in a location in order to perform an activity at the location.

9. The system of claim 8, wherein the plurality of snake robots are adapted to wind the rope around an object.

10. The system of claim 8, wherein the plurality of snake robots are adapted to tie the rope in a knot around an object.

11. The system of claim 8, further comprising:

at least one controller adapted to control movement of each of the plurality of snake robots.

12. The system of claim 8, further comprising:

at least one scanning module.

13. The system of claim 8, further comprising:

a global positioning system (GPS).

14. The system of claim 8, further comprising:

a laser adapted to be directed towards and to indicate the location; and a controller adapted to control movement of each of the plurality of snake robots to the location.

15. A method of controlling movement of at least one rope using a plurality of snake robots, the method comprising:

providing a system including:

the plurality of snake robots, wherein the plurality of snake robots are long, cylindrical shaped robots; and the at least one rope, wherein the plurality of snake robots are adapted to be coupled to the at least one rope, carry the at least one rope, steer the at least one rope along at least one path by collaborative movement of the plurality of snake robots, and place the at least one rope in a location in order to perform an activity at the location;

coupling the plurality of snake robots to the at least one rope; and remotely controlling the plurality of snake robots in order to control movement of the at least one rope.

16. The method of claim 15, wherein the plurality of snake robots are adapted to tie the at least one rope in a knot around an object, and further comprising:

tying the at least one rope in the knot around the object using the plurality of snake robots.

17. The method of claim 15, wherein the plurality of snake robots are adapted to wind the at least one rope around an object, and further comprising:

winding the at least one rope around the object using the plurality of snake robots.

18. The method of claim 15, further comprising:

tying the at least one rope around a tree branch using the plurality of snake robots, wherein the remotely controlling includes moving the plurality of snake robots up a tree to the tree branch and around the tree branch in order to tie the at least one rope to the tree branch.

19. The method of claim 15, wherein the system further includes at least one scanning module, and the method further comprises:

scanning an area around the plurality of snake robots using the at least one scanning module.

20. The method of claim 15, wherein the system further includes a laser adapted to be directed towards the location and to indicate the location, and the method further comprises:

aiming the laser at the location; and remotely controlling the plurality of snake robots to move to the location.

* * * * *